United States Patent
Smith et al.

(10) Patent No.: US 10,286,235 B2
(45) Date of Patent: May 14, 2019

(54) SYSTEMS AND METHODS FOR FLAMMABILITY REDUCTION AND VENTILATION USING NITROGEN-ENRICHED GAS FOR TRANSPORTATION VEHICLE PROTECTION

(71) Applicant: The Boeing Company, Chicago, IL (US)

(72) Inventors: David Smith, Santa Ana, CA (US); Douglas Ferguson, Cypress, CA (US)

(73) Assignee: The Boeing Company, Chicago, IL (US)

( * ) Notice: Subject to any disclaimer, the term of this patent is extended or adjusted under 35 U.S.C. 154(b) by 69 days.

(21) Appl. No.: 15/439,615

(22) Filed: Feb. 22, 2017

(65) Prior Publication Data

US 2018/0236278 A1    Aug. 23, 2018

(51) Int. Cl.
*A62C 2/04* (2006.01)
*B64D 45/00* (2006.01)
(Continued)

(52) U.S. Cl.
CPC .............. *A62C 2/04* (2013.01); *A62C 3/002* (2013.01); *A62C 3/08* (2013.01); *A62C 37/36* (2013.01);
(Continued)

(58) Field of Classification Search
CPC .. A62C 2/04; A62C 3/002; A62C 3/08; A62C 37/36; A62C 99/0018; A62C 35/023; B64D 45/00; B64D 2045/009
(Continued)

(56) References Cited

U.S. PATENT DOCUMENTS

| 4,126,184 A | * | 11/1978 | Hinrichs | ................ A62C 35/08 |
|---|---|---|---|---|
|   |   |   |   | 137/68.13 |
| 4,566,542 A | * | 1/1986 | Enk | ......................... A62C 3/08 |
|   |   |   |   | 137/266 |

(Continued)

FOREIGN PATENT DOCUMENTS

| EP | 2 623 160 | 8/2013 |
|---|---|---|
| EP | 2623159 | 8/2013 |
| EP | 3 128 298 | 2/2017 |

OTHER PUBLICATIONS

Extended European Search Report prepared by the European Patent Office in application No. 18157198.5 dated Aug. 3, 2018.

*Primary Examiner* — Steven J Ganey
*Assistant Examiner* — Joseph A Greenlund
(74) *Attorney, Agent, or Firm* — McDonnell Boehnen Hulbert & Berghoff LLP

(57) ABSTRACT

An example unit load device inerting system includes a nitrogen generation system, a first conduit coupled to the nitrogen generation system to carry nitrogen, an inlet located downstream of the first conduit and attached to a unit load device to deliver the nitrogen into the unit load device, an outlet attached to the unit load device, and a second conduit coupled to the outlet to carry gas out of the unit load device. An example method includes flowing nitrogen through a first conduit from a nitrogen generation system to an inlet located downstream of the first conduit and the inlet is attached to a unit load device to deliver the nitrogen into the unit load device, and venting the unit load device to transport gas out of the unit load device through a second conduit coupled to an outlet configured to be attached to the unit load device.

16 Claims, 10 Drawing Sheets

(51) Int. Cl.
*A62C 3/08* (2006.01)
*A62C 3/00* (2006.01)
*A62C 37/36* (2006.01)
*B65D 19/38* (2006.01)
*B65D 88/14* (2006.01)
*B65D 90/22* (2006.01)

(52) U.S. Cl.
CPC ............. *B64D 45/00* (2013.01); *B65D 19/38* (2013.01); *B64D 2045/009* (2013.01); *B65D 88/14* (2013.01); *B65D 90/22* (2013.01)

(58) Field of Classification Search
USPC .............................. 169/45, 47, 52, 53, 62, 11
See application file for complete search history.

(56) References Cited

U.S. PATENT DOCUMENTS

| | | | | |
|---|---|---|---|---|
| 5,156,009 | A | 10/1992 | Woodruff | |
| 5,308,382 | A * | 5/1994 | Prasad | B01D 53/22 426/418 |
| 5,766,281 | A * | 6/1998 | Luy | B01D 46/0067 95/281 |
| 5,845,714 | A * | 12/1998 | Sundholm | A62C 3/00 169/46 |
| 6,340,059 | B1 * | 1/2002 | Bethea | A62C 31/02 169/16 |
| 6,502,421 | B2 * | 1/2003 | Kotliar | A62C 3/0221 169/46 |
| 6,601,653 | B2 * | 8/2003 | Grabow | A62C 3/08 169/11 |
| 6,634,598 | B2 * | 10/2003 | Susko | B64D 37/32 137/209 |
| 6,763,894 | B2 * | 7/2004 | Schoenrock | A62C 31/02 169/11 |
| 7,152,635 | B2 * | 12/2006 | Moravec | B64D 37/32 141/64 |
| 7,690,438 | B2 * | 4/2010 | Bordallo Ivarez | B64D 1/18 169/11 |
| 7,806,195 | B2 * | 10/2010 | Popp | A62C 3/08 169/14 |
| 7,806,966 | B2 * | 10/2010 | Bose | B01D 53/24 55/385.3 |
| 7,900,709 | B2 | 3/2011 | Kotliar | |
| 8,763,712 | B2 * | 7/2014 | Kotliar | B64D 37/32 169/37 |
| 8,813,860 | B2 * | 8/2014 | Bleil | A62C 99/0018 169/11 |
| 8,857,736 | B1 * | 10/2014 | Finger | B08B 3/00 239/135 |
| 8,863,856 | B2 * | 10/2014 | Eckholm | A62C 37/38 169/16 |
| 8,925,642 | B2 * | 1/2015 | Meier | A62C 3/08 169/47 |
| 8,925,865 | B2 * | 1/2015 | Stolte | B64D 25/00 169/46 |
| 9,033,061 | B2 * | 5/2015 | Chattaway | A62C 37/44 169/11 |
| 9,072,921 | B2 * | 7/2015 | Ribarov | A62C 3/08 |
| 9,526,931 | B2 * | 12/2016 | Ferguson | A62C 3/08 |
| 9,941,526 | B2 * | 4/2018 | Kawai | H01M 8/04156 |
| 9,963,239 | B2 * | 5/2018 | Fukuda | B64D 37/32 |
| 9,994,331 | B2 * | 6/2018 | Family | B64D 37/32 |
| 10,035,609 | B2 * | 7/2018 | Ziarno | B64D 45/00 |
| 2003/0233936 | A1 * | 12/2003 | Crome | A62B 7/14 95/96 |
| 2004/0163826 | A1 * | 8/2004 | Spring | A62C 3/06 169/46 |
| 2006/0021652 | A1 * | 2/2006 | Surawski | B64D 37/32 137/209 |
| 2008/0029277 | A1 * | 2/2008 | Lemaitre | A62C 3/07 169/62 |
| 2010/0263882 | A1 | 10/2010 | Bodemann | A62C 35/62 169/17 |
| 2012/0217028 | A1 * | 8/2012 | Chattaway | A62C 3/08 169/62 |
| 2014/0053726 | A1 | 2/2014 | Evosevich et al. | |
| 2014/0110137 | A1 * | 4/2014 | Ribarov | A62C 3/08 169/44 |
| 2014/0116249 | A1 | 5/2014 | Evosevich et al. | |
| 2014/0158382 | A1 * | 6/2014 | Ferguson | A62C 3/08 169/46 |
| 2016/0030788 | A1 * | 2/2016 | Swift | A62C 37/46 169/61 |

* cited by examiner

SYSTEMS AND METHODS FOR FLAMMABILITY REDUCTION AND VENTILATION USING NITROGEN-ENRICHED GAS FOR TRANSPORTATION VEHICLE PROTECTION

FIELD

The present disclosure relates generally to systems and methods for unit load device inerting measures, and more particularly to, methods for flammability reduction and ventilation using nitrogen-enriched gas for transportation vehicle protection.

BACKGROUND

The transportation of goods by vehicles, such as aircraft, requires protection systems to be installed in the vehicles. Although packaging and shipping requirements often include safety measures intended for safe carriage of goods, additional measures are intended to contain and control effects of a fire if a fire is started.

As an example, aircraft cargo compartments generally include fire protection systems that are able to mitigate many aspects of a fire involving dangerous goods. Some mitigation measures incorporated by operators carrying dangerous goods include systems to discharge fire suppression agents directly into containers after a fire has been recognized, installing a supplemental fire suppression system consisting of a temperature sensing system recognizing an overheat condition in a specific container or pallet that then causes a foam fire suppression agent to be injected into that particular container or pallet, using fire resistant containers and fire containment covers, and incorporating a fire detection system inside a fire hardened container that discharges suppression agent in reaction to the fire.

Some of these measures require that all cargo be loaded into special containers or loaded on pallets with special coverings that are non-industry standard. To accomplish this within some aircraft models, the mitigation measures require that the container height be several inches below a cargo ceiling, which limits a size of the container that can be loaded.

In addition, a production rate of toxic smoke or flammable gases and other byproducts associated with fires involving some dangerous goods can be greater than a capability of some aircraft features designed for mitigating aspects of cargo fires. The potential for excessive smoke production rates from fires has led some aircraft operators to install special systems that inflate transparent bags to displace smoke.

What is needed is a system to enable fire reduction within transportation vehicles while allowing for full cargo transportation with fewer restrictions.

SUMMARY

In one example, a unit load device inerting system is described that comprises a nitrogen generation system, a first conduit coupled to the nitrogen generation system and configured to carry nitrogen, an inlet located downstream of the first conduit and configured to be attached to a unit load device to deliver the nitrogen into the unit load device, an outlet configured to be attached to the unit load device, and a second conduit coupled to the outlet, wherein the second conduit is configured to carry gas out of the unit load device.

In another example, a unit load device inerting system is described that comprises a unit load device having an inlet port positioned on a first wall of the unit load device and an outlet port positioned on a second wall of the unit load device, a nitrogen generation system coupled to the inlet port of the unit load device to deliver nitrogen into the unit load device, an outlet configured to be attached to the outlet port of the unit load device, and a conduit coupled to the outlet to carry gas out of the unit load device.

In still another example, a method is described comprising flowing nitrogen through a first conduit from a nitrogen generation system to an inlet located downstream of the first conduit, and the inlet is configured to be attached to a unit load device to deliver the nitrogen into the unit load device. The method also comprises venting the unit load device to transport gas out of the unit load device through a second conduit coupled to an outlet configured to be attached to the unit load device.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Figure 1:
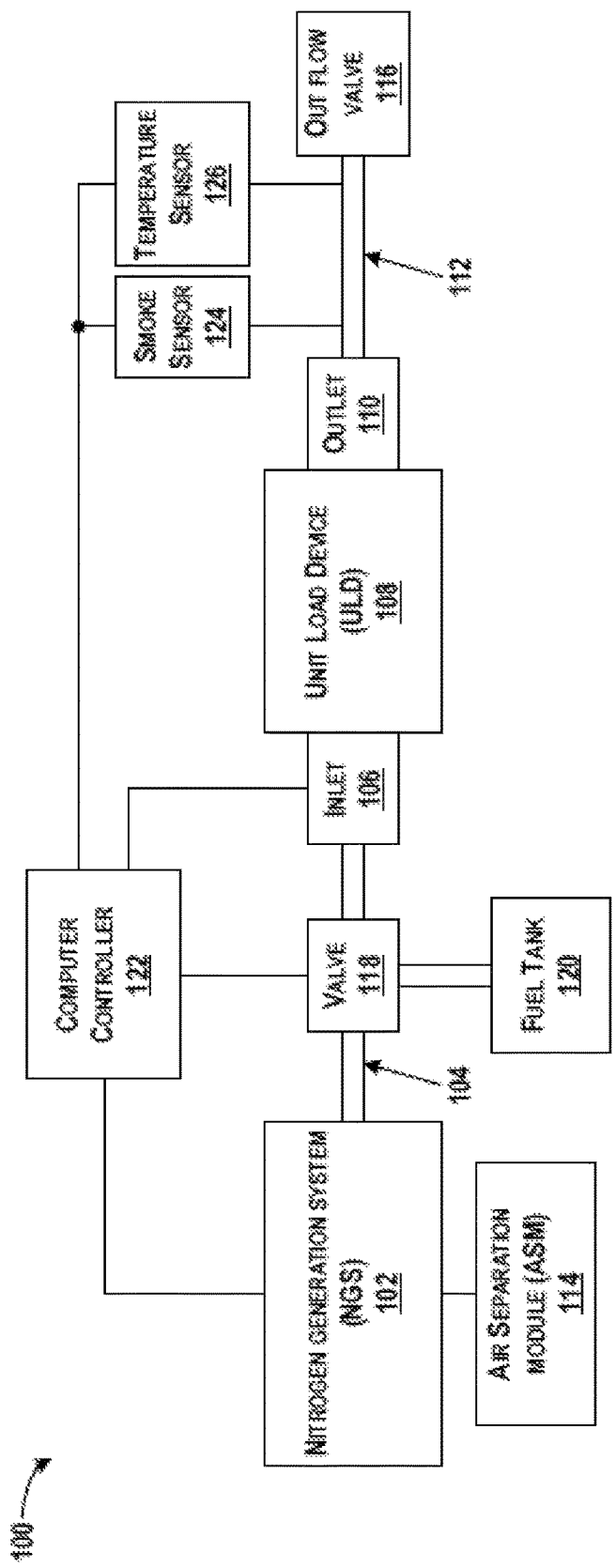
FIG. 1 is a block diagram of a unit load device inerting system, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Carriage and transportation of goods by vehicles, including lithium batteries, can require mitigation and safety procedures to be implemented. As an example, with aircraft, cargo compartment fire protection systems are included, but may not be designed to control or prevent a fire involving some goods. In addition to the high heat release during a fire, a production rate of toxic smoke, flammable gases, and other byproducts associated with fires involving some dangerous goods can create further issues. Further, for some goods such as lithium batteries, it is desired to prevent thermal run away while the goods are stored within a container on the vehicle.

Example methods and systems described herein help to prevent a fire from being initiated and enable a continuous stream of nitrogen enriched air (at varying ratios of nitrogen/oxygen) to be flowed into a specific volume, such as a cargo container or cargo compartment, to initiate and maintain a reduced oxygen concentration. A venting mechanism is also described to minimize accumulation of potentially hazardous vapors or toxic smoke and transport such vapors in a controlled manner outside of the volume.

Nitrogen enriched gas is used to inert an aircraft cargo compartment or container, and the cargo compartment or container can be continuously ventilated for an entire duration of the flight. In some examples, systems described below may not be designed or intended as fire suppression systems, but rather as cargo volume flammability reduction systems to lower the possibility of a fire being initiated. Particularly with dangerous goods that have a potential to release flammable vapors prior to a fire starting or being detected, a capability to reduce flammability of the vapors within an enclosed region provides an effective mitigation measure to prevent a fire from occurring. Example systems flow a nitrogen enriched air stream into the volume prior to a fire occurring, and any flammable vapors that may be present are ventilated overboard, thus minimizing a hazardous condition and making the region less flammable than it would otherwise be with a normal oxygen air stream. This reduces a possibility of ignition and ability for a fire to be sustained, regardless of a type of cargo being carried.

Within examples including the vehicles as aircraft, fuel tanks are made inert using a nitrogen generation system and this existing nitrogen generation system is extended to further include transporting nitrogen gas (e.g., an inert gas) into unit loading devices. The system can include a shutoff valve for controlling gas flow into the unit load devices, and inlet and outlet points that allow the nitrogen gas to flow from the shutoff valve into and out of the unit load devices. Quick disconnects can be used for allowing quick connect/disconnect to the unit load device. Additional features may include smoke and temperature sensors or detectors located downstream of the unit load devices for monitoring an environment within the unit load devices.

Incorporation of a fixed ventilation system that exhausts the nitrogen enriched air also exhausts any potential flammable or toxic vapors that may result from accidents involving the dangerous goods, and further reduces a possibility of excessive smoke produced from dangerous goods entering occupied compartments on the vehicle.

Referring now to FIG. 1, a block diagram of a unit load device inerting system 100 is illustrated, according to an example implementation. The system 100 a nitrogen generation system 102 coupled to a first conduit 104 that is configured to carry nitrogen. The system 100 also includes an inlet 106 located downstream of the first conduit 104, and the inlet 106 is configured to be attached to a unit load device (ULD) 108 to deliver the nitrogen into the ULD. The system 100 also includes an outlet 110 configured to be attached to the ULD 108, and a second conduit 112 coupled to the outlet 110. The second conduit 112 is configured to carry gas out of the ULD 108.

The nitrogen generation system 102 may include or be coupled to an air separation module (ASM) 114 to further generate nitrogen gas. In some examples, the ASM 114 can be located adjacent to the NGS 102. The NGS 102 may generate nitrogen gas from liquid nitrogen or may generate nitrogen gas by separation from ambient air, for example. For instance, the ASM 114 may use semi-permeable, hollow fiber membranes, packaged in a cylindrical container to remove oxygen from a compressed air stream to generate a nitrogen enriched air (NEA) stream.

The first conduit 104 and the second conduit 112 may include galvanized steel piping, aluminum tubing, or other gas piping as well. The second conduit 112 connects to an outflow valve 116, which can be a valve on a skin of an aircraft that is modulated to maintain pressure inside the aircraft as desired. In another example implementation, the second conduit 112 may not be connected directly to the outflow valve 116, but may be located such that the gas would leave the second conduit 112 in a vicinity of the outflow valve 116. For example, the second conduit 112 may be connected to a volume, and the outflow valve 116 is connected to the volume. The second conduit 112 thus provides a path for vented nitrogen enriched air to exit the ULD 108.

The ULD 108 includes a cargo container for an aircraft. In some examples, the ULD is substantially air-tight sealed. The inlet 106 and the outlet 110 can be reversibly attached to the ULD 108, as described in more detail below.

The system 100 is also shown to include a valve 118 located downstream of the nitrogen generation system and coupled to the first conduit 104. The valve 118 may control flow of nitrogen between two separate areas of the transportation vehicle. As one example, the valve 118 controls flow of nitrogen between the first conduit 104 and a nitrogen inerting system for a fuel tank 120. Thus, the NGS 102 may generate nitrogen gas that can be used for inerting the ULD 108 as well as the fuel tank 120, and the valve 118 can be operated to direct flow of nitrogen gas as needed. Within some examples, however, the valve 118 may be removed or may be unnecessary and replaced with two separate valves—one to shut off flow to the fuel tank 120 and one to shut off flow to the ULD 108 (described in the example shown in FIG. 5).

The system 100 is also shown to include a computer controller 122 coupled or connected to the NGS 102, the valve 118, and the inlet 106. The computer controller 122 can control operation of the NGS 102 to turn it on and off for generation of nitrogen gas, as well as control operation of the valve 118 to enable flow of nitrogen to the fuel tank 120 or to the inlet 106, and also to control or monitor operation of the inlet 106 to determine a flow of nitrogen gas into the ULD 108. In an example in which the NGS 102 is on-board an aircraft, the computer controller 122 controls operation of the NGS 102 to deliver the nitrogen gas into the ULD 108 at certain times during operation of the aircraft, such as (i) prior to take-off of the aircraft in flight, and (ii) continuously for an entire duration of the aircraft in flight except during a portion of a descent. Other example operations of the NGS 102 enabling flow of nitrogen into the ULD 108 are described below and can include flowing nitrogen gas during an entire duration of the aircraft in flight as well.

Additional example details of the computer controller 122 are shown and described below with reference to FIG. 16.

The system 100 further includes a smoke sensor 124 located downstream of the ULD 108 and connected to the second conduit 112, and a temperature sensor 126 located downstream of the ULD 108 and also connected to the second conduit 112. The smoke sensor 124 and the temperature sensor 126 are further coupled to the computer controller 122 to provide outputs of sensed conditions.

The computer controller 122 enables selective operation of the NGS 102, or selective delivering of nitrogen gas through the valve 118 and into the ULD 108. Some selective operation can occur based on smoke and temperature detection. Thus, the computer controller 122 receives an output of the smoke sensor 124, and can trigger operation of the NGS 102 if smoke is detected to ventilate the ULD 108 as well as send a notification based on smoke being detected. The computer controller 122 can also receive an output of the temperature sensor 126, and can trigger operation of the NGS 102 if a temperature above a threshold is detected (e.g., such as above 200° C.) to ventilate the ULD 108 as well as and send a notification based on a temperature detected above a threshold temperature.

In an example operation, the system 100 flows nitrogen through the first conduit 104 from the NGS 102 to the inlet 106 located downstream of the first conduit 104, and the inlet 106 is configured to be attached to the ULD 108 to deliver the nitrogen into the ULD 108. Further, the ULD 108 is vented to transport gas out of the ULD 108 through the second conduit 112 coupled to the outlet 110 configured to be attached to the ULD 108. Operation may be controlled by the computer controller 122. In examples where the NGS 102 is on-board an aircraft, the system 100 can be operated to continuously flow the nitrogen for an entire duration of the aircraft in flight, or for an entire duration of the aircraft in flight except during a portion of a descent. In addition, the system 100 can be operated to flow the nitrogen prior to take-off of the aircraft in flight.

Figure 2:
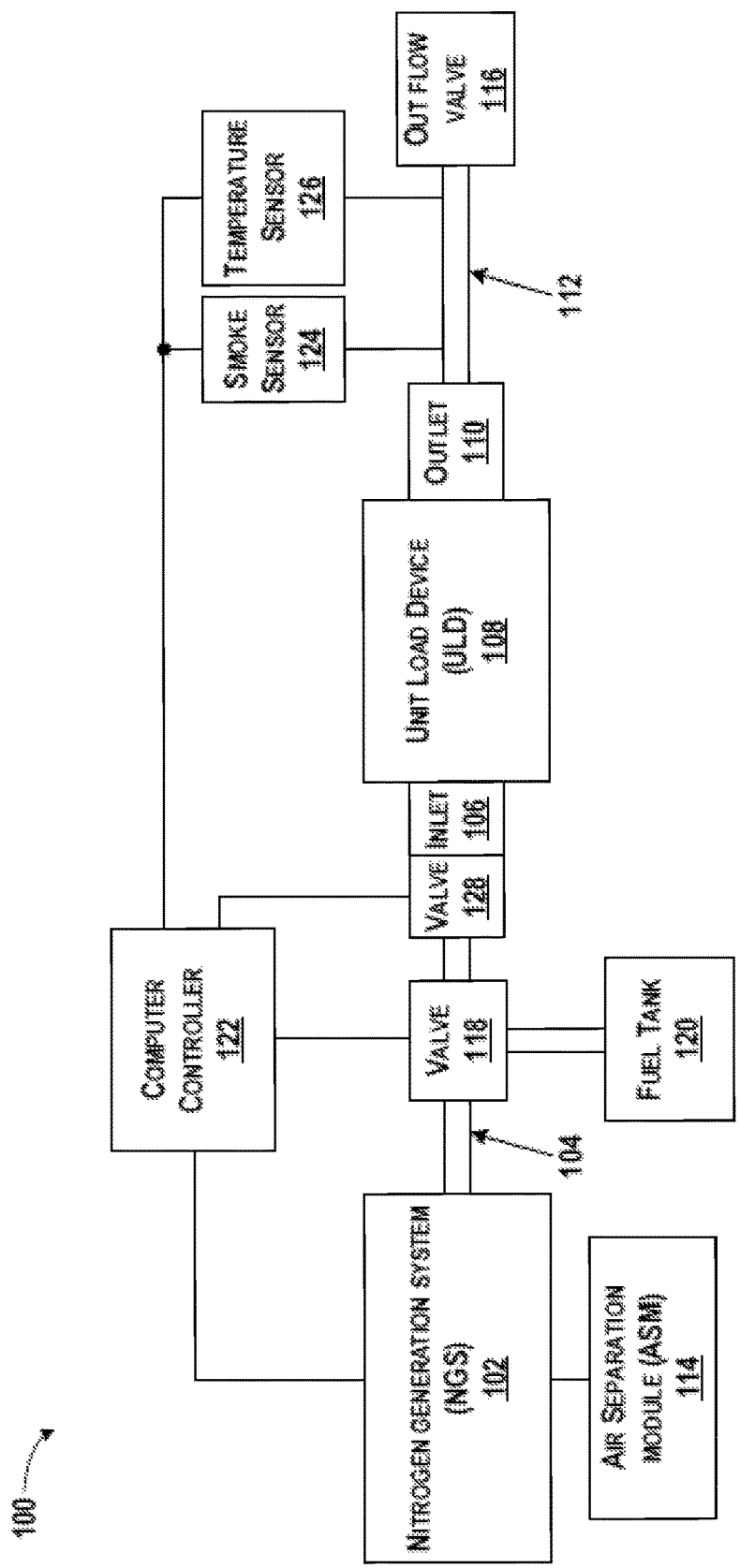
FIG. 2 is another block diagram of the unit load device inerting system, according to an example implementation.

FIG. 2 is another block diagram of the unit load device inerting system 100, according to an example implementation. In FIG. 2, an additional valve 128 is included connected to the inlet 106. The valve 128 may be a component of the inlet 106 or separate as well. The computer controller 122 is connected to the valve 128, and can operate the valve 128 to control a flow of nitrogen gas into the ULD 108. This may enable the computer controller 122 to control both of the valves 118 and 128 to cause a flow of nitrogen gas into both of the fuel tank 120 and the ULD 108 at desired amounts.

Figure 3:
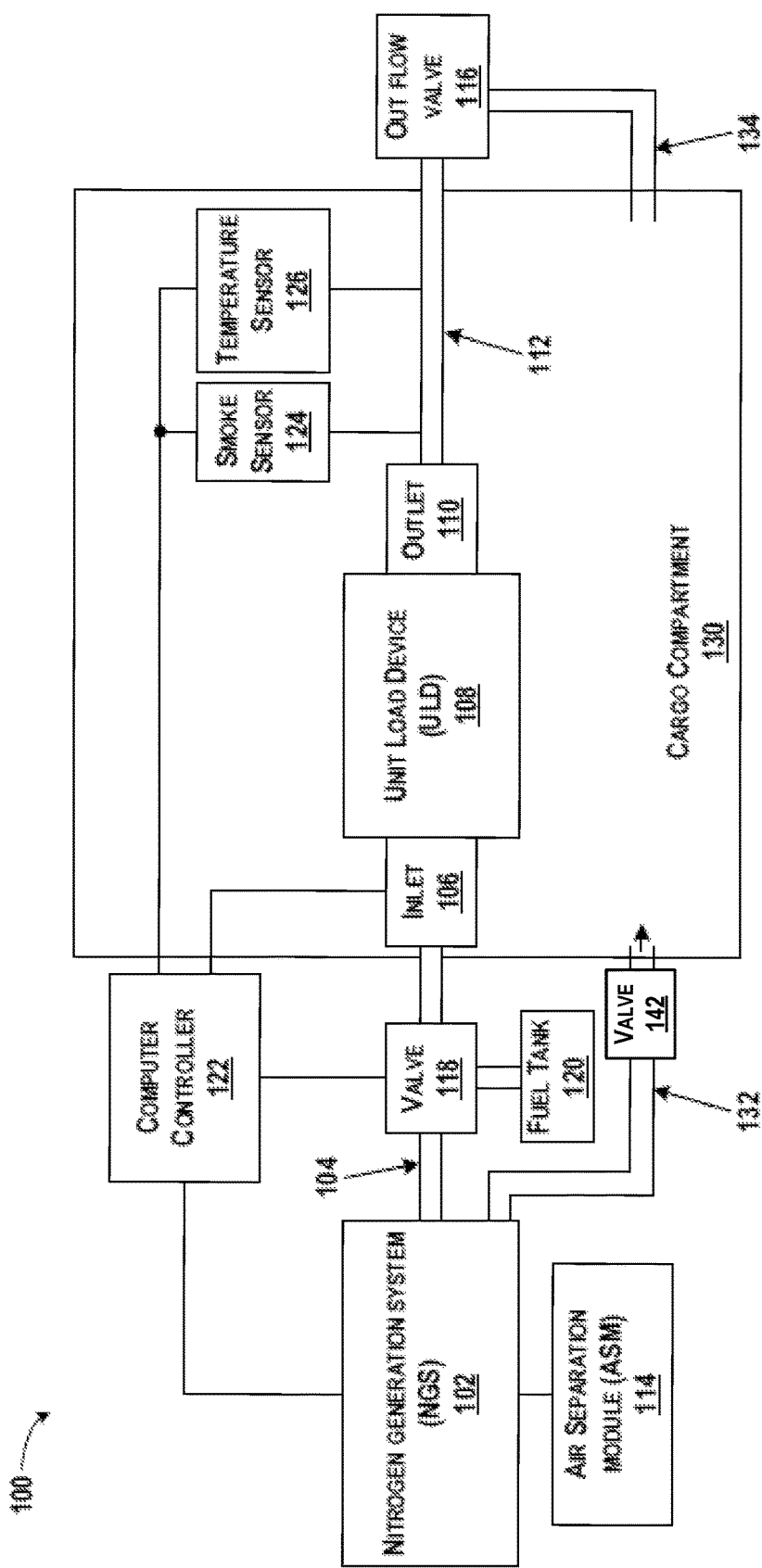
FIG. 3 is another block diagram of the unit load device inerting system, according to an example implementation.

FIG. 3 is another block diagram of the unit load device inerting system 100, according to an example implementation. In FIG. 3, a cargo compartment 130 of the transportation vehicle is shown (e.g., cargo compartment of an aircraft), and the ULD 108 as well as the inlet 106, the outlet 110, the smoke sensor 124 and the temperature sensor 126 are included within the cargo compartment 130. A third conduit 132 is shown coupled to the NGS 102 through a valve 142, and configured to carry nitrogen into the cargo compartment 130, and a fourth conduit 134 is connected to the cargo compartment 130 and configured to transport gas out of the cargo compartment 130 to the outflow valve 116 for ventilation. In this example, additional nitrogen gas may be flowed into the entire area of the cargo compartment 130, if desired when the valve 142 is opened, and when cargo is not transported within specific containers. Nitrogen gas can further be flowed into the ULD 108 as well. In some examples, it is more beneficial to flow nitrogen gas into the ULD 108 rather than the cargo compartment 130 due to size and volume differences and an amount of nitrogen gas that can be generated by the NGS 102 is limited.

However, in some examples, if there is a mixed load in the cargo compartment 130 including some dangerous goods, some non-hazardous goods, some live animals, etc., it may not be desired to flood the cargo compartment 130 with a concentration of nitrogen gas, and thus, the flow of nitrogen gas can be limited to the ULD 108 including the dangerous goods.

Figure 4:
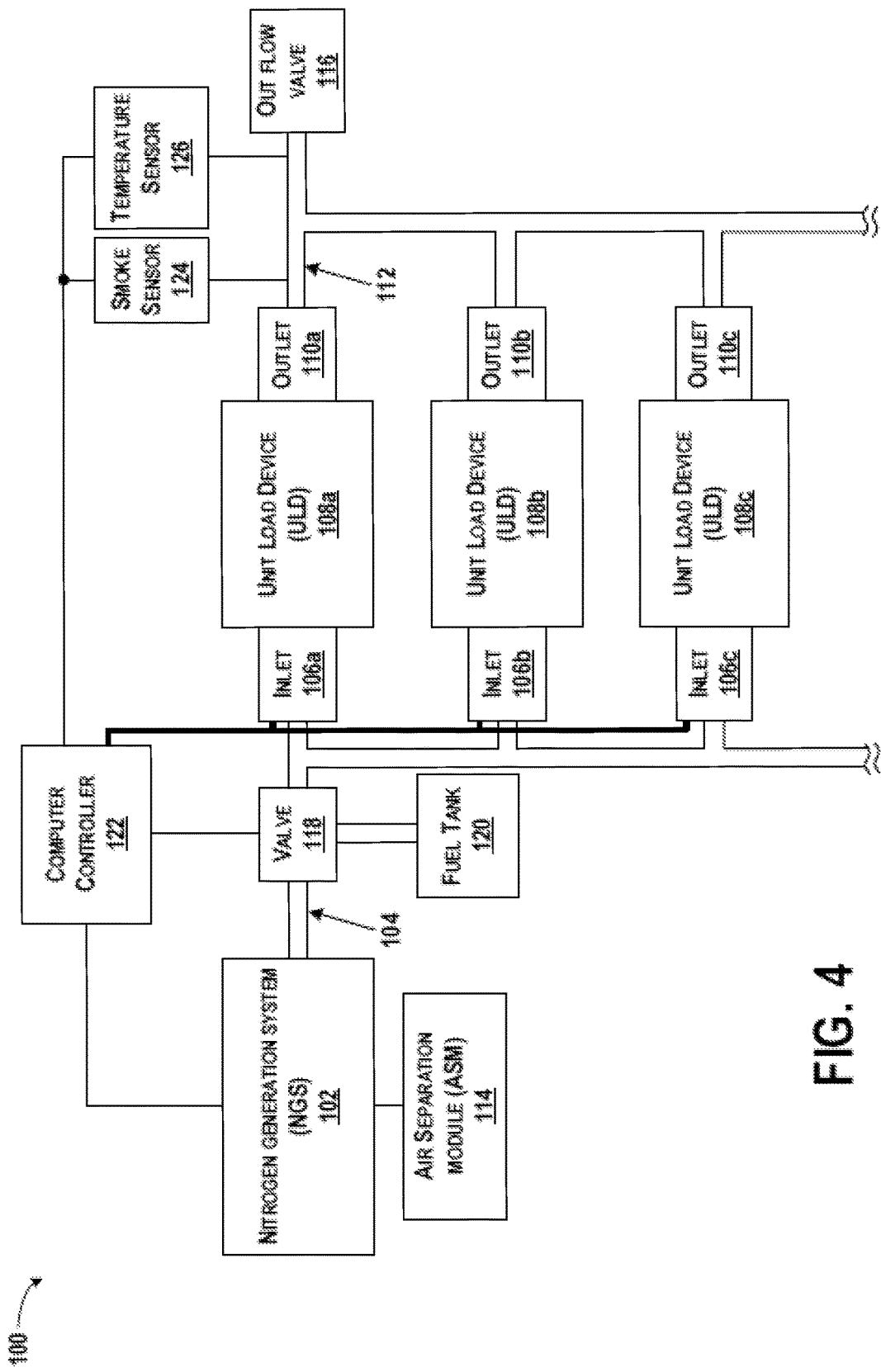
FIG. 4 is another block diagram of the unit load device inerting system, according to an example implementation.

FIG. 4 is another block diagram of the unit load device inerting system 100, according to an example implementation. In FIG. 4, the system 100 includes a plurality of inlets 106a-c located downstream of the first conduit 104, and the plurality of inlets 106a-c are configured to be attached to a plurality of unit load devices 108a-c. A plurality of outlets 110a-c are configured to be attached to the plurality of unit load devices 108a-c, and the second conduit 112 is coupled to the plurality of outlets 110a-c and is configured to carry gas out of the plurality of unit load devices 108a-c.

The computer controller 122 enables selective operation of the NGS 102, or selective delivering of nitrogen gas through the valve 118 and into the ULD 108. The computer controller 122 is also coupled to the plurality of inlets 106a-c to selectively operate the plurality of inlets 106a-c to deliver the nitrogen into the plurality of unit load devices 108a-c (e.g., each of the inlets 106a-c may include the valve 128). Some selective operation can occur based on contents of the ULD 108. For example, it may only be desired to deliver the nitrogen gas into ULDs that are carrying dangerous or hazardous goods. Thus, the computer controller 122 may operate the inlets 106a-c accordingly to deliver or prevent nitrogen gas as needed.

In other examples, the computer controller 122 can operate the inlets 106a-c to deliver nitrogen gas into the ULDs 108a-c based on contents of the ULDs 108a-c and/or based also on contents of neighboring ULDs 108a-c. For example, if the ULD 108b is carrying hazardous goods, it may be beneficial to deliver nitrogen gas into the ULD 108b as well as also into the ULDs 108a and 108c even if the ULDs 108a and 108c are not carrying hazardous goods as a precaution to prevent any type of possible hazardous situation. As another example, if the ULD 108b is carrying goods for which nitrogen gas may be harmful (e.g., food products, livestock, etc.), then the computer controller 122 may operate the inlets 106a-c to prevent nitrogen gas into the ULD 108b and also to prevent nitrogen gas into the ULDs 108a and 108c as well due to be proximal to or neighboring to the ULD 108b.

Figure 5:
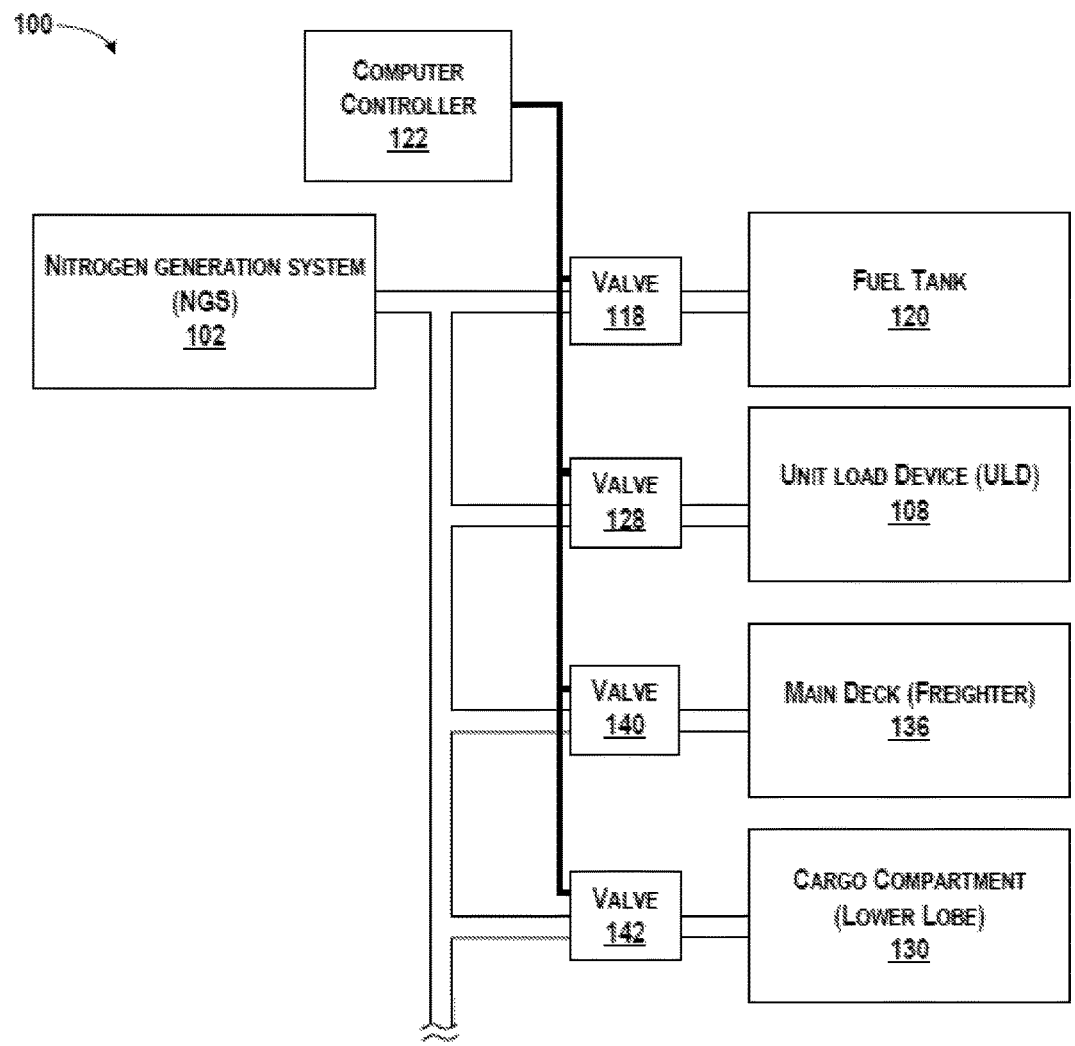
FIG. 5 is another block diagram of the unit load device inerting system, according to an example implementation.

FIG. 5 is another block diagram of the unit load device inerting system 100, according to an example implementation. In FIG. 5, the NGS 102 is shown coupled to the fuel tank 120 and the ULD 108, as well as to a main deck 136 of a freighter vehicle, and the cargo compartment 130 in a lower lobe of an aircraft. Additional valves 140 and 142 can be included to control flow of nitrogen gas into the main deck 136 and the cargo compartment 130. The computer controller 122 can thus control any of the valves 118, 128, 140, and 142 to cause nitrogen gas to flow into desired areas, or to prevent nitrogen gas from flowing into desired areas.

The system 100 may be included on any type of vehicle including an aerial vehicle (e.g., a winged aerial vehicle, an un-manned aerial vehicle (UAV), a drone, a rotorcraft device, a multicopter), a land vehicle (e.g., car, truck, train), a water vehicle, or a water submersible vehicle, among other possibilities.

Figure 6:
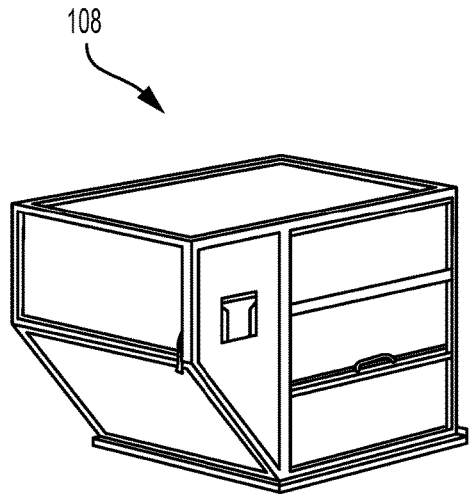
FIG. 6 illustrates an example of the ULD, according to an example implementation.
Figure 7:
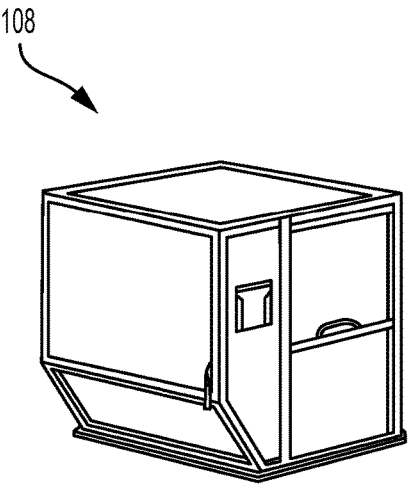
FIG. 7 illustrates another example of the ULD, according to an example implementation.

FIG. 6 illustrates an example of the ULD 108, according to an example implementation. FIG. 7 illustrates another example of the ULD 108, according to an example implementation. The ULD 108 is a container for cargo, anal may be arranged in various configurations and sizes. The ULD 108 is shown to have angled sides that generally match a shape of an aircraft cargo compartment. Doors on the ULD 108 can be canvas or solid, and the ULD 108 can have various sections or internal compartments. Many standard sizes of ULDs are used in aircraft, and the ULD 108 may take any form, such as an LD1, LD2, LD3, LD3 reefer, half pallet, LD4, LD6, LD7, LD8, LD9, LD9 reefer, LD11, LD26, LD29, LD39, P6P pallet, Demi (half pallet base), Type A pen, HMA stall, M1, M1H, main deck pallet (MDP), M6, or M2, for example. Depending on the specific style of ULD, the ULD 108 may be any size to fit in the transportation vehicle, and example sizes include a 5 ft×5 ft×6 ft or a 8 ft×5 ft×5 ft, and as another specific example, an LD3 is 79 inches wide, by 64 inches tall, by 60.4 inches in length. With an angled side, an LD3 has a width of the bottom at 61.5 inches compared to a width of the top of 79 inches. However, in other examples, any size or type of container may be used for the ULD 108.

Figure 8:
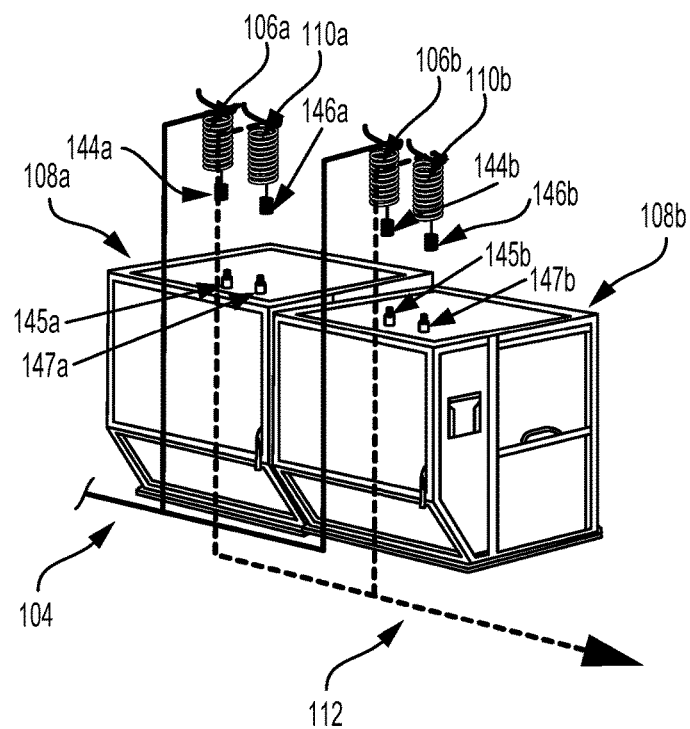
FIG. 8 illustrates an example arrangement of the ULDs, according to an example implementation.

FIG. 8 illustrates an example arrangement of the ULDs 108a-b, according to an example implementation. In FIG. 8, the inlets 106a-b located downstream of the first conduit 104 are configured to be reversibly attached to the ULDs 108a-b, and the outlets 110a-b are also configured to be reversibly attached to the ULDs 108a-b. The inlets 106a-b and the outlets 110a-b are shown as coiled spiral tubes or flexible hoses that retract to a ceiling to enable quick connections and disconnects to hook up to the ULDs 108a-b during loading. The inlets 106a-b and the outlets 110a-b can be mounted to a ceiling, and pulled down manually to connect to the ULDs 108a-b during loading, for example.

The inlets 106a-b may further include disconnect devices 144a-b coupled to the inlets 106a-b enabling reversible attachment of the inlets 106a-b to the ULD 108. The outlets 110a-b may also further include disconnect devices 146a-b coupled to the outlets 110a-b enabling reversible attachment of the outlets 110a-b to the ULD 108. For example, the disconnect devices 144a-b and 146a-b may be female connectors located at the ends of the flexible hoses. When loading the ULD 108a-b onto the aircraft, the female connector is pulled down by an operator and connects to a male counterpart (e.g., disconnect devices 145a-b and 147a-b) that is attached to the ULD 108.

The second conduit 112 attaches to the outlets 110a-b (e.g., the flexible hoses) that is mounted in the cargo compartment. Similar to connecting the first conduit 104, when loading the ULD 108 onto the aircraft, the disconnect device 146a-b is pulled down by an operator and connects the female connector to its male counterpart that is attached to the ULD 108.

Figure 9A:
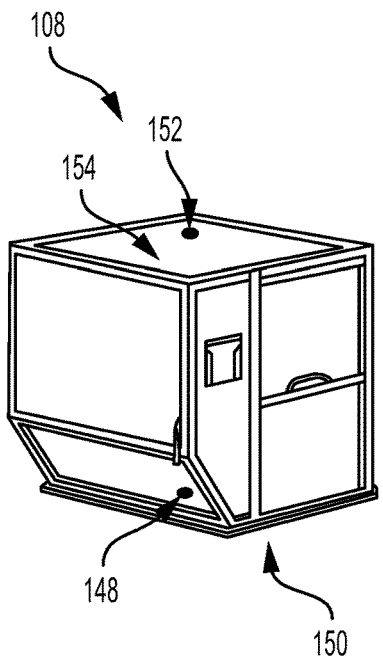
FIG. 9A illustrates another example of the ULD, according to an example implementation.

FIG. 9A illustrates another example of the ULD 108, according to an example implementation. The ULD 108 has an inlet port 148 positioned on a first wall 150 of the ULD 108 and an outlet port 152 positioned on a second wall 154 of the ULD 108. The NGS 102 can be coupled to the inlet port 148 of the ULD 108, through the inlet 106, to deliver nitrogen into the ULD, and the outlet 110 is configured to be attached to the outlet port 152 of the ULD 108.

As shown in FIG. 9A, the first wall 150 of the ULD 108 include a bottom of the ULD 108, and the second wall 154 includes a top of the ULD 108, and the inlet port 148 is positioned proximal to the bottom and the outlet port 152 is positioned proximal to the top. In other examples, the ULD 108 may be substantially rectangular in shape, and the inlet port 148 is positioned diagonally across the ULD from the outlet port 152.

By the term "substantially" or "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The ULD 108 shown in FIG. 9A receives the nitrogen gas at the inlet port 148 on a bottom/right side and outputs gas at the outlet port 152 at a top/left side of the ULD 108 to obtain to a sweeping action of nitrogen gas passing across the ULD 108.

Figure 9B:
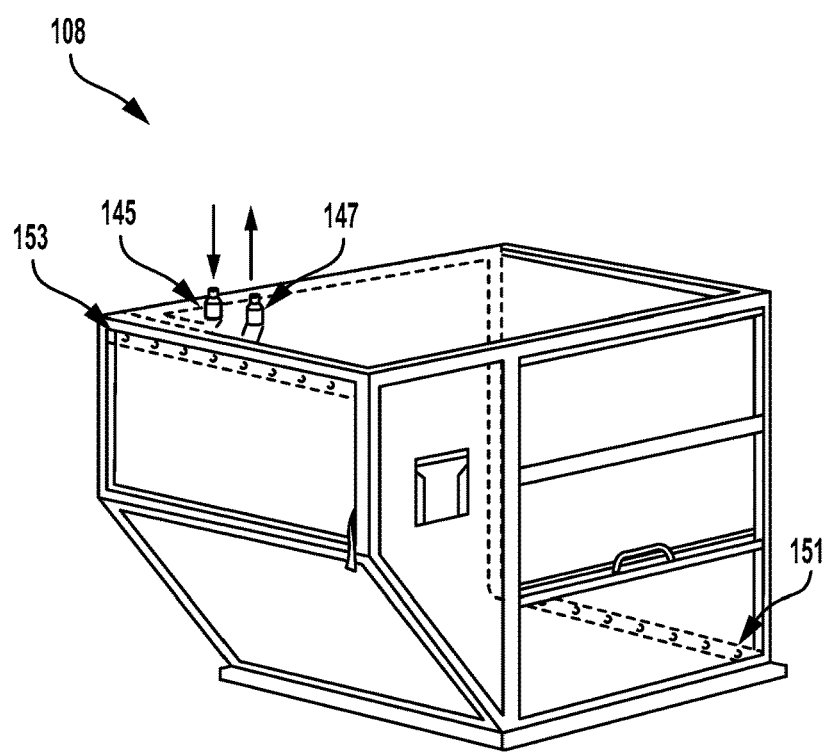
FIG. 9B illustrates another example of the ULD, according to an example implementation.

FIG. 9B illustrates another example of the ULD 108, according to an example implementation. In FIG. 9B, the ULD 108 is shown with disconnect devices 145 and 147, which may be the male counterpart to the disconnect devices 144a-b and 146a-b for connection to the hoses. Also shown in FIG. 9B is internal piping for the nitrogen gas and venting as well. Piping 151 connects to the first conduit 104 through the disconnect device 145 for receiving the nitrogen gas and distributing the nitrogen gas at a bottom of the ULD 108. The piping 151 has vents or holes to enable gas to be distributed at the bottom, as shown. A second piping 153 is shown connected to the disconnect device 147, and is located at a top of the ULD 108 on an opposite side from the piping 151 to collect gas and vent the ULD 108. In this configuration, gas is distributed at a bottom of the ULD 108, and gas is vented at a top of the ULD 108 to flow over any contents of the ULD 108.

Figure 10:
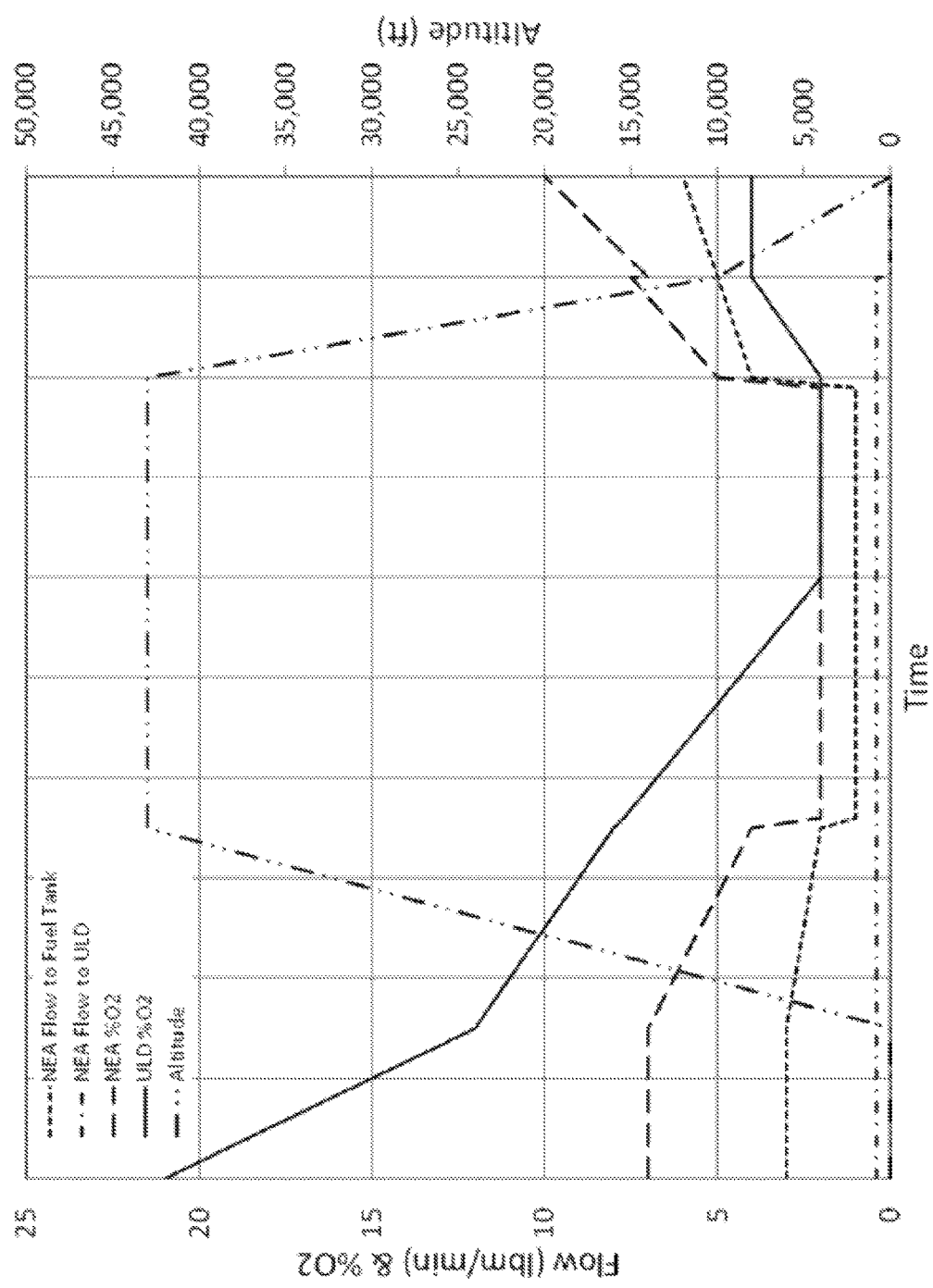
FIG. 10 is an example graph illustrating oxygen concentration over time and altitude, according to an example implementation.

FIG. 10 is an example graph illustrating oxygen concentration over time and altitude, according to an example implementation. The graph illustrates oxygen concentration over time for specific altitudes, and as within the ULD 108. For example, it may be desirable to maintain a certain oxygen concentration inside of the ULD 108 to lower any possibility of a fire being started inside the ULD 108. To do so, the oxygen concentration inside of the ULD 108 may be maintained below about 12%, for example, to provide an inert atmosphere inside the ULD 108. Thus, the NEA concentration to the ULD can be above 20% for a majority of the flight. In other examples, the oxygen concentration inside of the LID 108 may be maintained below about 11%, as shown in the graph in FIG. 10, over different altitudes.

Figure 11:
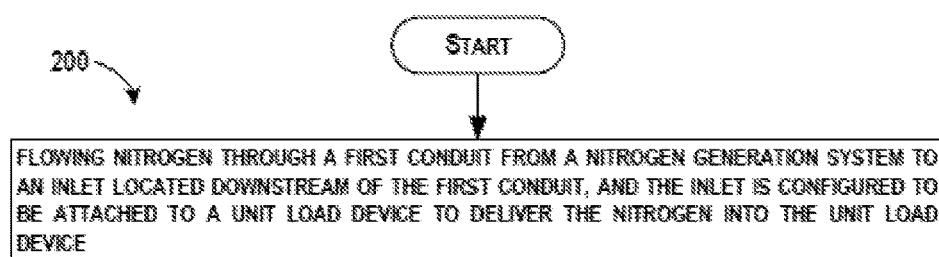
FIG. 11 shows a flowchart of an example method, according to an example implementation.

FIG. 11 shows a flowchart of an example method 200, according to an example implementation. Method 200 shown in FIG. 11 presents an example of a method that could be used with the system 100 shown in FIGS. 1-5, for example. Further, devices or systems may be used or configured to perform logical functions presented in FIG. 11. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 200 may include one or more operations, functions, or actions as illustrated by one or more of blocks 202-204. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples.

At block 202, the method 200 includes flowing nitrogen through the first conduit 104 from the NGS 102 to the inlet 106 located downstream of the first conduit 104, and the inlet 106 is configured to be attached to the ULD 108 to deliver the nitrogen into the ULD 108. At block 204, the method 200 includes venting the ULD 108 to transport gas out of the ULD 108 through the second conduit 112 coupled to the outlet 110 configured to be attached to the ULD 108.

Figure 12:
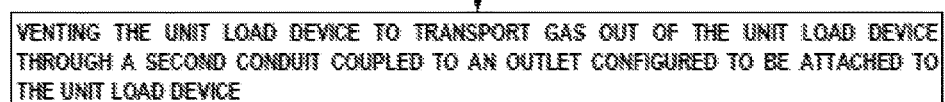
FIG. 12 shows a flowchart of an example method for use with the method of FIG. 11, according to an example implementation.

FIG. 12 shows a flowchart of an example method for use with the method 200, according to an example implementation. The NGS 102 may be included on-board an aircraft, and at block 206, functions include continuously flowing the nitrogen for an entire duration of the aircraft in flight. This can include, for example, an always on operating condition for continuous inerting of the ULD 108.

Figure 13:
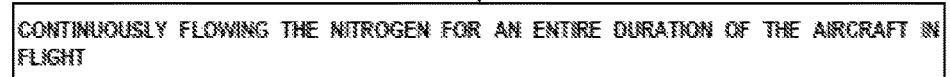
FIG. 13 shows a flowchart of an example method for use with the method of FIG. 11, according to an example implementation.

FIG. 13 shows a flowchart of an example method for use with the method 200, according to an example implementation. At block 208, functions include flowing the nitrogen prior to take-off of the aircraft in flight. This can include, for example, a pre-inert phase on ground before take-off.

Figure 14:
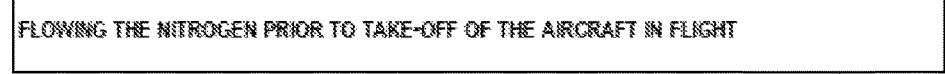
FIG. 14 shows a flowchart of an example method for use with the method of FIG. 11, according to an example implementation.

FIG. 14 shows a flowchart of an example method for use with the method 200, according to an example implementation. At block 210, functions include continuously flowing the nitrogen for an entire duration of the aircraft in flight except during a portion of a descent. As an example, the NGS 102 can be operated to inert the ULD 108 down to about an altitude of 10,000 feet during the descent at which time the NGS 102 can be operated to inert the fuel tank 120. Thus, the NGS 102 would be operated during the entire flight in this example. In other examples, the functions include flowing the nitrogen for an entire duration of the aircraft in flight, and the nitrogen may be directed to the ULD 108 as needed.

Additional example sequences for operating the system 100 include operating the NGS 102 to inert the ULD 108 during a climb and during cruise altitude to constantly ventilate volume within the ULD 108 with nitrogen gas to maintain an oxygen concentration within the ULD 108 at low levels.

Figure 15:
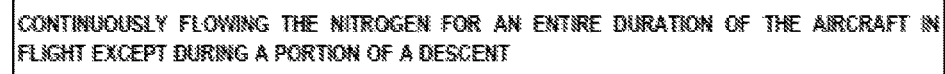
FIG. 15 shows a flowchart of an example method for use with the method of FIG. 11, according to an example implementation.

FIG. 15 shows a flowchart of an example method for use with the method 200, according to an example implementation. At block 212, functions include selecting one or more unit load devices of the plurality of unit load devices to which to deliver the nitrogen based on contents of the plurality of unit load devices.

The example systems and methods described herein enable providing unique fire prevention systems for ULD containers to enable safer carriage of hazardous cargo including lithium batteries. Nitrogen gas is flowed into the containers compartment to ventilate and provide an inert atmosphere to lower the opportunity for a fire to be started. This also prevents gases from building up to prevent fire from occurring.

Figure 16:
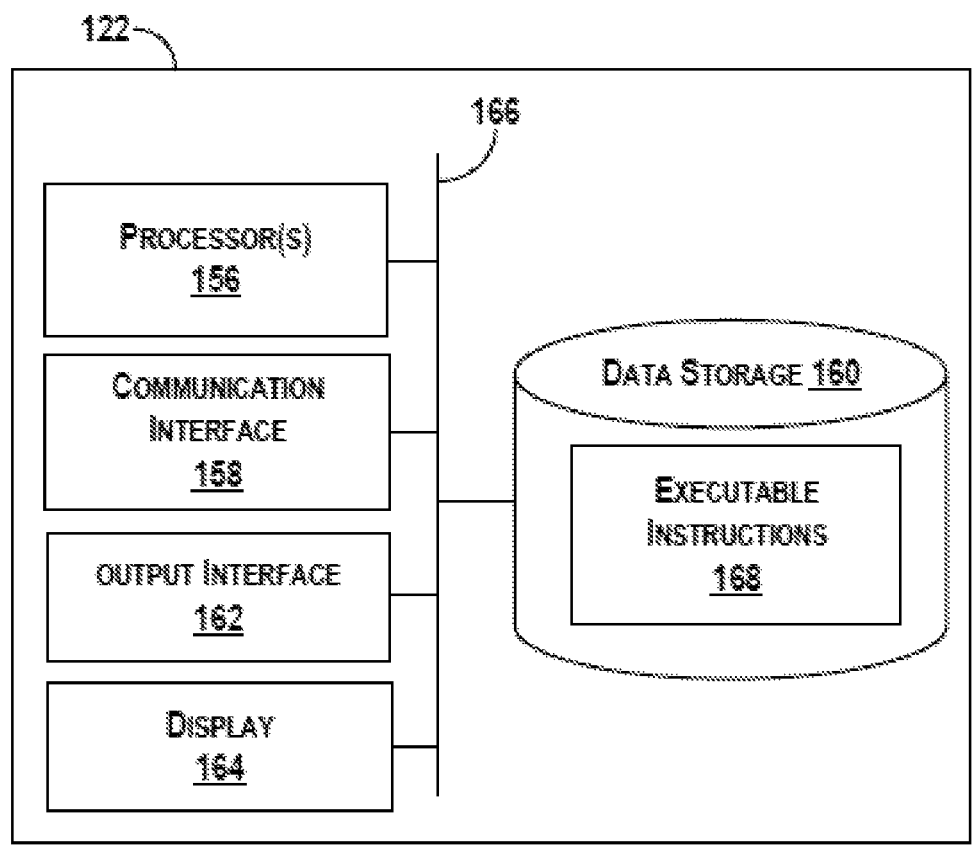
FIG. 16 is a block diagram illustrating an example of the computer controller, according to an example implementation.

FIG. 16 is a block diagram illustrating an example of the computer controller 122, according to an example implementation. The computer controller 122 may be used to perform functions of methods shown in FIGS. 11-15. The computer controller 122 has a processor(s) 156, and also a communication interface 158, data storage 160, an output interface 162, and a display 164 each connected to a communication bus 166. The computer controller 122 may also include hardware to enable communication within the computer controller 122 and between the computer controller 122 and other devices (not shown). The hardware may include transmitters, receivers, and antennas, for example.

The communication interface 158 may be a wireless interface and/or one or more wireline interfaces that allow for both short-range communication and long-range communication to one or more networks or to one or more remote devices. Such wireless interfaces may provide for communication under one or more wireless communication protocols, such as Very High Frequency (VHF) Data link (VDL), VDL Mode 2, Aircraft Communications Addressing and Reporting System (ACARS) digital communications over VHF radio and satellite communications (SATCOM), Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces may include aircraft data buses such as Aeronautical Radio, Incorporated (ARINC) 429, 629, or 664 based interfaces, Ethernet interface, a Universal Serial Bus (USB) interface, or similar interface to communicate via a wire, a twisted pair of wires, a coaxial cable, an optical link, a fiber-optic link, or other physical connection to a wireline network. Thus, the communication interface 158 may be configured to receive input data from one or more devices, and may also be configured to send output data to other devices.

The communication interface 158 may also include a user-input device, such as a keyboard or mouse, for example.

The data storage 160 may include or take the form of one or more computer-readable storage media that can be read or accessed by the processor(s) 156. The computer-readable storage media can include volatile and/or non-volatile storage components, such as optical, magnetic, organic or other memory or disc storage, which can be integrated in whole or in part with the processor(s) 156. The data storage 160 is considered non-transitory computer readable media. In some examples, the data storage 160 can be implemented using a single physical device (e.g., one optical, magnetic, organic or other memory or disc storage unit), while in other examples, the data storage 160 can be implemented using two or more physical devices.

The data storage 160 thus is a non-transitory computer readable storage medium, and executable instructions 168 are stored thereon. The instructions 168 include computer executable code. When the instructions 168 are executed by the processor(s) 156, the processor(s) 156 are caused to perform functions. Such functions include selecting one or more unit load devices of the plurality of unit load devices to which to deliver the nitrogen based on contents of the plurality of unit load devices.

The processor(s) 156 may be a general-purpose processor or a special purpose processor (e.g., digital signal processors, application specific integrated circuits, etc.). The processor(s) 156 may receive inputs from the communication interface 158, and process the inputs to generate outputs that are stored in the data storage 160 and output to the display 164. The processor(s) 156 can be configured to execute the executable instructions 168 (e.g., computer-readable program instructions) that are stored in the data storage 160 and are executable to provide the functionality of the computer controller 122 described herein.

The output interface 162 outputs information to the display 164 or to other components as well. Thus, the output interface 162 may be similar to the communication interface 158 and can be a wireless interface (e.g., transmitter) or a wired interface as well. The output interface 162 may send instructions to the NGS 102 to operate for generation of nitrogen gas during specific sequences of flight, for example.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A unit load device inerting system comprising:
   a nitrogen generation system, wherein the nitrogen generation system is on-board an aircraft;
   a first conduit coupled to the nitrogen generation system and configured to carry nitrogen;
   an inlet located downstream of the first conduit, wherein the inlet is configured to be attached to a unit load device to deliver the nitrogen into the unit load device;
   an outlet configured to be attached to the unit load device;
   a second conduit coupled to the outlet, wherein the second conduit is configured to carry a gas out of the unit load device; and
   a computer controller coupled to the nitrogen generation system and controlling operation of the nitrogen generation system to deliver the nitrogen into the unit load device (i) prior to take-off of the aircraft in flight, and (ii) for an entire duration of the aircraft in flight except during a portion of a descent.

2. The unit load device inerting system of claim 1, wherein the unit load device is a cargo container for an aircraft.

3. The unit load device inerting system of claim 1, further comprising a shutoff valve located downstream of the nitrogen generation system and coupled to the first conduit, wherein the shutoff valve controls flow of nitrogen between the first conduit and a nitrogen inerting system for a fuel tank.

4. The unit load device inerting system of claim 1, further comprising:
   a third conduit coupled to the nitrogen generation system and configured to carry nitrogen into a cargo compartment of an aircraft.

5. The unit load device inerting system of claim 1, further comprising:
   a plurality of inlets located downstream of the first conduit, wherein the inlet is one of the plurality of inlets, and wherein the plurality of inlets are configured to be attached to a plurality of unit load devices to selectively deliver the nitrogen into the plurality of unit load devices.

6. The unit load device inerting system of claim 5, further comprising:
   the computer controller coupled to the plurality of inlets to selectively operate the plurality of inlets to deliver the nitrogen into the plurality of unit load devices based on contents of the plurality of unit load devices.

7. The unit load device inerting system of claim 1, further comprising:
   a plurality of outlets configured to be attached to a plurality of unit load devices, wherein the outlet is one of the plurality of outlets; and
   the second conduit coupled to the plurality of outlets, wherein the second conduit is configured to carry the gas out of the plurality of unit load devices.

8. The unit load device inerting system of claim 1, further comprising:
   a temperature sensor located downstream of the unit load device; and
   the computer controller receiving an output of the temperature sensor and sending a notification based on a temperature detected above a threshold temperature.

9. The unit load device inerting system of claim 1, further comprising:
   a smoke sensor located downstream of the unit load device; and
   the computer controller receiving an output of the smoke sensor and sending a notification based on smoke being detected.

10. The unit load device inerting system of claim 1, further comprising:
    a disconnect device coupled to the inlet enabling reversible attachment of the inlet to the unit load device; and
    a disconnect device coupled to the outlet enabling reversible attachment of the outlet to the unit load device.

11. A unit load device inerting system comprising:
    a unit load device having an inlet port positioned on a first wall of the unit load device and an outlet port positioned on a second wall of the unit load device;
    a nitrogen generation system coupled to the inlet port of the unit load device to deliver nitrogen into the unit load device, wherein the nitrogen generation system is on-board an aircraft;
    an outlet configured to be attached to the outlet port of the unit load device;
    a conduit coupled to the outlet to carry a gas out of the unit load device; and
    a computer controller coupled to the nitrogen generation system and controlling operation of the nitrogen generation system to deliver the nitrogen into the unit load device (i) prior to take-off of the aircraft in flight, and (ii) for an entire duration of the aircraft in flight except during a portion of a descent.

12. The unit load device inerting system of claim 11, wherein the unit load device has a top and a bottom, and wherein the inlet port is positioned proximal to the bottom.

13. The unit load device inerting system of claim 11, wherein the unit load device has a top and a bottom, and wherein the outlet port is positioned proximal to the top.

14. The unit load device inerting system of claim 11, wherein the unit load device is substantially rectangular in shape, and wherein the inlet port is positioned diagonally across the unit load device from the outlet port.

15. A method comprising:
flowing nitrogen through a first conduit from a nitrogen generation system to an inlet located downstream of the first conduit, wherein the nitrogen generation system is on-board an aircraft and wherein the inlet is configured to be attached to a unit load device to deliver the nitrogen into the unit load device;
continuously flowing the nitrogen to deliver the nitrogen into the unit load device (i) prior to take-off of the aircraft in flight, and (ii) for an entire duration of the aircraft in flight except during a portion of a descent; and
venting the unit load device to transport a gas out of the unit load device through a second conduit coupled to an outlet configured to be attached to the unit load device.

16. The method of claim 15, wherein a plurality of inlets are located downstream of the first conduit, wherein the inlet is one of the plurality of inlets, and wherein the plurality of inlets are configured to be attached to a plurality of unit load devices, the method further comprising:
selecting one or more unit load devices of the plurality of unit load devices to which to deliver the nitrogen based on contents of the plurality of unit load devices.

* * * * *